(No Model.)

H. C. McILWAIN.
EYEPIECE FOR TELESCOPES.

No. 488,506.  Patented Dec. 20, 1892.

Attest  
C. W. Miles  
Geo. Ashton

Inventor  
Henry C. McIlwain  
By Wood & Boyd, Attys

UNITED STATES PATENT OFFICE.

HENRY C. McILWAIN, OF NULL'S MILLS, ASSIGNOR OF ONE-HALF TO J. N. HUSTON, OF CONNERSVILLE, INDIANA.

EYEPIECE FOR TELESCOPES.

SPECIFICATION forming part of Letters Patent No. 488,506, dated December 20, 1892.

Application filed May 5, 1892. Serial No. 431,922. (No model.)

*To all whom it may concern:*

Be it known that I, HENRY C. MCILWAIN, a citizen of the United States, residing at Null's Mills, in the county of Fayette and State of Indiana, have invented certain new and useful Improvements in Eyepieces for Telescopes, of which the following is a specification.

The object of my invention is the construction of an eye piece free from the detrimental effects of spherical and chromatic aberration, and consists of a double lens or combination of two lenses on one cylindrical piece of glass.

The various features of my invention are fully set forth in the description of the accompanying drawings making a part of this specification, in which—

Figure 1:
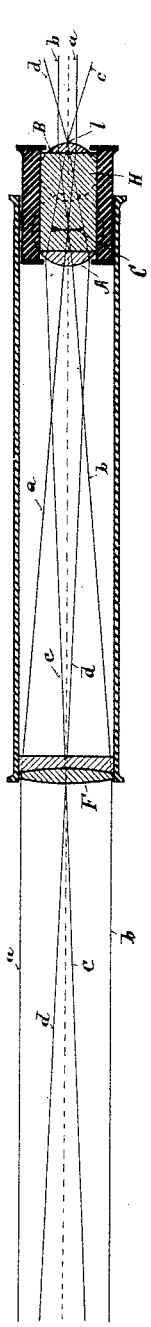
Figure 2:
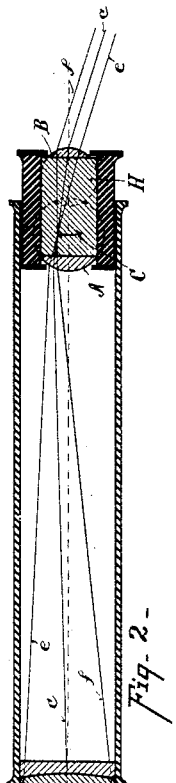
Figure 3:
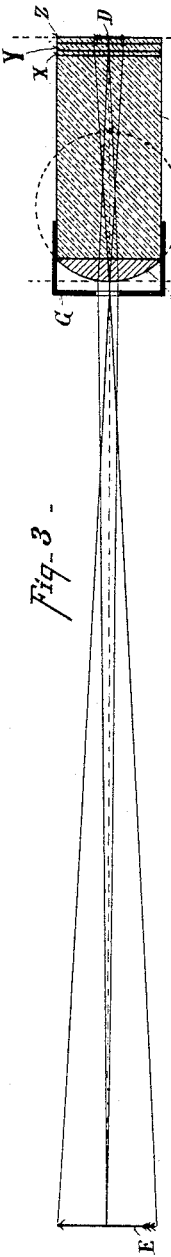
Figure 4:
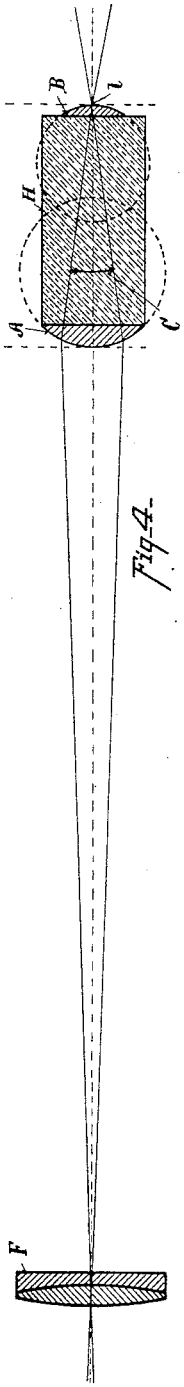

Figure 1 is a central vertical section of my improvement in position for use. Fig. 2 is a similar view or diagram illustrating the path of the rays of light. Fig. 3 is a similar view illustrating the mode of determining the proportion and position of the parts. Fig. 4 is a view similar to Fig. 1 showing the completion of the eyepiece Fig. 3.

In the modifications shown in Figs. 1 and 2, the glass is made of three pieces. A represents a plano-convex lens of a given focal length. B represents a smaller plano-convex lens forming the opposite end of the eye piece; the plain faces of these lenses A, B, are joined together by a cylinder of solid glass, the end of the cylinder being closely fitted to the plain faces of the lenses; thereby making practically one solid lens with the two opposite faces or ends of different curvatures. But the same effect may be made by making the lens and cylinder of one solid piece of glass if desired.

In Fig. 1 the lines $a, b$, indicate the course of the extreme parallel rays from the distant object in passing through the instrument. It will be observed that after passing through the object glass and lens A they intersect at the axis of a sphere describing the face of the lens A which is indicated by the center of the arrow C. $c, d$, represent the extreme axial rays of light from the distant object which pass first through the object glass F, thence through the lens A and out through the lens B, emerging at the axis or center $l$ of said lens, and this is the proper construction of the two lenses A, B, and their location with reference to the object glass F. The curvature of the lenses A, B, if protracted into spheres would have their centers a considerable distance from each other, which is a necessary feature of construction in order to obtain the proper result. In this construction the focus of the absolutely parallel rays $a, b$, is at the center of the sphere describing the face of lens A, which point is also the focus of similar rays passing out of the opposite face B next to the eye. The course of the inclined axial rays and of those parallel thereto is illustrated in Fig. 2, where the rays from the extreme point of the object on one side only are shown. The various rays illustrated by the lines $e, c, f$, are passed, say to one side of the eye piece. Owing to the length of the cylinder and curvatures of the faces they pass out in parallel lines as shown at the right of lens B and at similar points with reference to the center of its refracting surface that they were received upon the object glass, and hence they emerge harmoniously; and with this construction the spherical and chromatic aberrations are both corrected by the differential refractions of the faces.

The following is the preferred form of ascertaining the proper length of glass cylinder between the eye pieces A, B, for an object glass of given focal length.

Fig. 3 represents the manner of procedure. A plano-convex lens A is first formed of the desired size to make the eye piece of the focal length wanted. H represents the cylinder of glass in rear thereof. X, Y, Z, represent movable disks which are employed to increase or diminish the length of the cylinder; the end disk Z is provided with a face of ground glass for receiving the image, see small arrow D. G represents a diaphragm covering the end of the lens A, with a small opening, say not more than one-eighth of an inch in diameter for the size of lens shown in the drawings. In order to ascertain the proper length for the glass cylinder H, a stationary object E is set at a distance from the center of the sphere describing the face of the lens A equal to the focal length of the object glass with which it is designed to be used. The lens A and object E remain fixed at this distance apart and the ground glass Z is adjusted until the image appears clearly upon the ground surface at the center of the glass and this is the point which should be occupied by the center $l$ of the lens B; the curvature of which must be made so as to have its focus at the axis of A.

In Fig. 4 I have represented the eye piece placed in position at this point as determined by the diagram Fig. 3. The length of the cylinder H having been once obtained for object glasses of a given focal length, as many as desired may thereafter be cut to the desired length and finished ready to receive the lenses A, B, or the cylinder may be cut with the lenses A, B, integral therewith if desired.

It is evident that with the lens A of any given radius, the length of the eye piece and focal length of the face B will vary with the refractive power of the glass, and focal length of the object glass with which it is designed to be used; the length of the glass cylinder and radius of B requiring to be made shorter as the focal length of the object glass increases.

Having described my invention what I claim is—

1. The combination with the object glass, of a solid glass eye-piece having the larger plano-convex lens A and the smaller plano-convex lens B of such proportion and relation that the image of the distant object through the object glass is formed at the center of the sphere describing the larger lens which is the focus of the smaller lens, substantially as described.

2. The combination with the object glass, of an eye-piece composed of a solid glass cylinder having a larger plano-convex lens A on the front end and a smaller plano-convex lens B on the rear end, said lenses being of such size and the length of the cylinder between the lenses so arranged that the axial rays of object glass are coincident with the axial rays of the smaller lens, substantially as described.

3. In a telescope or similar optical instrument the combination with the object glass of an eye piece consisting of the lenses A, B, and interposed glass cylinder H, the said glasses being arranged so that the image of the object glass is formed in the cylinder H at the axis of a sphere describing the face of lens A, and at a distance from lens B equal to its focal length, substantially as specified.

4. The combination with the object glass, of an eye-piece composed of solid glass having a larger curvature for the front face and a smaller curvature for the rear face, said curvatures being of such size and the length of glass between them securing the faces at such distance apart that the axial rays of the object glass are coincident with the axial rays of the smaller face, substantially as described.

In testimony whereof I have hereunto set my hand.

HENRY C. McILWAIN.

Witnesses:
HYATT L. FROST,
LON R. CONNER.